April 20, 1954     O. MUELLER     2,676,037
HIGH-PRESSURE FLUID CONNECTOR
Filed June 9, 1948
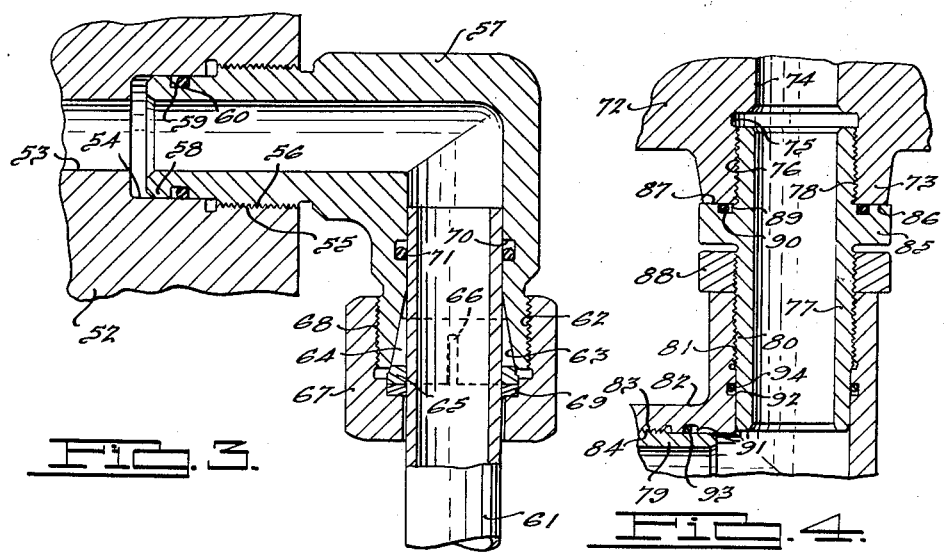
INVENTOR.
Otto Mueller
BY
Harness, Dickey & Pierce
ATTORNEYS.

Patented Apr. 20, 1954

2,676,037

UNITED STATES PATENT OFFICE 2,676,037

HIGH-PRESSURE FLUID CONNECTOR

Otto Mueller, Dearborn, Mich.

Application June 9, 1948, Serial No. 31,955

6 Claims. (Cl. 285—55)

1

This invention relates to tube fittings generally and more particularly to novel leak-proof fittings adapted for use in connection with high pressure fluid conducting systems.

Fittings of this general character heretofore known in the art have utilized tapered pipe threads on the various mating sections of the fitting but these are undesirable not only from the standpoint of assembly where variously shaped sections are required but also because of the restricted limitations of adjustment available with fitting sections possessing such tapered pipe threads. Moreover, where high fluid pressure systems are utilized such threads permit undesirable sweating or leaking at the various points of union. The leakage problem has been solved to some extent by the use of lock collets or wedge-shaped inserts generally insertable within a tightening nut joining two sections of the fitting but these too have their drawbacks and are expensive thereby adding to the cost of the fitting assembly.

An object of the present invention therefore is to provide a novel tube fitting adapted for use with high pressure fluid systems utilizing either liquid or pneumatic pressures, whereby the foregoing disadvantages have been overcome.

Another object of the invention is to provide a novel and simple leak-proof tube fitting adapted for use with high pressure fluid conducting systems.

A further object is to provide a novel tube fitting adapted for use in high pressure fluid conducting systems in which the heretofore utilized tapered pipe threads on the various mating sections of the fitting have been dispensed with and in their stead conventional straight threads are provided thereby imparting a greater range of adjustment to the various threaded sections of the fitting than that heretofore available. Moreover, but a minimum amount of physical effort is required to threadably engage the various mating sections of the fitting as distinguished from the amount of effort previously required in threadably engaging sections utilizing tapered pipe threads.

Another object is to provide a novel, simple and inexpensive sealing joint or expedient between mating sections of a tube fitting whose sealability improves with increasing pressure.

A further object is to provide a novel leak-proof tube fitting for high pressure fluid systems whose threaded parts utilize simple, straight threads and wherein one section of two abutting sections is formed with an annular channel

2 or groove accommodating therein a yieldable sealing gland or ring located either ahead or beyond the threaded section so that any fluid pressure escaping between the two sections simply compresses the sealing gland or ring between the two sections to prevent passage or leaking of the fluid beyond the seal and thus assuring a leak-proof joint.

A still further object of the present invention is to provide a novel and simple O-ring seal between the flat surfaces of adjoining sections of a tube fitting adapted for use with hydraulic or other fluid conducting systems.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

In the drawing wherein several forms of the novel high pressure tube fittings hereof are illustrated:

Figure 1 is a side elevation view in section of one form of novel tube fitting adapted for use with the delivery side of a fluid pressure system having a recessed portion for accommodating an end wall of the fitting;

Fig. 2 is a side elevation view in section of a second form of the novel tube fitting of the present invention adapted for use with the delivery side of a fluid pressure system;

Fig. 3 is a side elevation view in section of a further form of the novel tube fitting hereof having an adapter provided with a male connection;

Fig. 4 is a side elevation view in section similar to Fig. 3 of a still further form of the novel tube fitting hereof; and Fig. 5 is a side elevation view in section of the novel tube fitting hereof having a female connection.

Referring now to the drawings for a more detailed description of the present invention and more particularly to Fig. 1 thereof, one form of the novel tube fitting hereof is shown as applied to the delivery side of a pump or other suitable source of fluid under pressure having a side wall 10 provided with a generally flat end surface 11 and having an outlet passage 12 formed therein. Concentrically formed with passage 12 in wall 10 at the outer end thereof is an annular or otherwise suitably shaped recessed portion 13 whose flat end surface 14 is in a plane parallel to and to the rear of the plane of end surface 11. A mounting panel 15 is fastened to wall 10 by suitable means such as bolts 16 and is provided with an internally threaded opening 17 which is concentric with passage 12 and has a diameter greater than the diameter of recessed portion 13.

The novel tube fitting hereof for conducting fluid under pressure from outlet 12 of the pump to a conduit 18, for example, comprises a tube 19 having at one end a shoulder 20 adapted for engagement with the flat end surface 14 of the recessed portion 13 and at its other end, an externally threaded portion 21, the tube finally terminating in a reduced portion 22. Sleeved on tube 19 is a hexagonal nut 23 having an extending hollow shank 24 provided with an externally threaded portion 25 adapted for threaded engagement with opening 17 of the mounting panel, the shank near its outer end being provided with an internal shoulder 26 adapted for abutting engagement with shoulder 20 of tube 19 for a purpose presently to appear.

For connecting tube 19 with conduit 18, a hollow coupling member or nut 27 is provided having at one end thereof an internally threaded portion 28 adapted for engagement with threaded portion 21 of tube 19 and at its other end having an internally inclined wall 29 and an externally threaded portion 30. Sleeved on conduit 18 is a conventional tapered lock collet 31, a tapered wall of which engages with inclined wall 29 of coupling 27. A hollow tightening nut 32 is sleeved on conduit 18 and is provided with an internally threaded portion 33 engaging with externally threaded portion 30 of the coupling. Tightening of nut 32 will compress the collet into firm engagement with the barrel of conduit 18.

In accordance with the present invention, the various threaded sections hereinabove described constitute straight, standard threads as distinguished from tapered pipe threads so that a greater range of adjustment is available for the coupling or tightening nuts relative to the various sections of the fitting. For example, coupling 27 may be turned a considerable distance relative to tube 19 and thus compensate for the length of either tube 19 or conduit 18. Moreover, by the use of straight threads a minimum amount of physical force is required to accomplish an adjustment of any one or more of the parts of the fitting.

The novel seal of the present invention with the use of which a leak-proof high pressure fitting is provided constitutes an O-ring interposed between any two separable sections of the fitting, at which sections, in the absence of the seal, leaks would otherwise develop. To this end the flat end face of shoulder 20 of tube 19 is formed with an annular groove or channel 34 defining a cavity or chamber for the reception and retention therein of a yieldable endless sealing ring or gland 35. The end surface of the shoulder portion of tube 19 is urged into intimate contact with the end surface 14 of recess 13 of wall 10 through engagement of shoulder 26 of nut 23 with shoulder 20 of the tube accomplished by adjustment of the nut.

It will now be readily apparent that as fluid under pressure is ejected from outlet 12 to tube 19, any such fluid under pressure escaping between the engaging flat end surfaces of wall 10 and tube 19 will enter cavity 34 and compress gland 35 to urge the latter into forced contact with an outer side of the cavity and the flat end surface of the wall so that the fluid is positively prevented from flowing therebeyond. The sealing gland thus affords a leak-proof joint, the effectiveness of which is increased with increasing pressures.

The same novel seal hereof is also provided between tube 19 and coupling 27 and between the latter and conduit 18. To this end the inner periphery of coupling 27 is formed with two spaced annular grooves or channels 36 and 37 for cooperating with the outer walls of tube 19 and conduit 18, respectively. Groove 36 defines a cavity having an endless compressible sealing gland or ring 38 therein and groove 37 defines a cavity having an endless compressible sealing gland or ring 39 therein. Thus any fluid under pressure passing between the outer wall of tube 19 and an inner wall of coupling 27 or between the outer wall of conduit 18 and an inner wall of coupling 27, will impinge on and compress glands 38 and 39 within their respective cavities whereby the fluid is positively prevented from passing therebeyond.

While the novel leak-proof fitting hereof has been explained in it use with fluid pressure systems, either hydraulic or pneumatic, it is to be expressly understood that it is not limited to such use but that it can be applied equally as well for use with vacuum pressure systems, in the latter event the sealing glands instead of being compressed or urged towards an outer side of their respective cavities will instead be compressed and urged against an inner side of their respective cavities.

The novel fitting hereof illustrated in Fig. 2 of the drawing while generally similar to that of Fig. 1 differs thereover in that an elbow fitting or coupling 40 rather than the straight coupling 27 is utilized. In this modification the flat end surface 11 of member 10 while having the aperture 12 lacks the recessed portion 13 of Figure 1 so that the flat end surface of shoulder 20 of tube 19 engages directly with the flat end surface 11 of the member. Nut 23, as before, threadedly engages with the threaded opening 17 of the supporting panel or plate 15 to urge the flat end surfaces of the member and tube into intimate contact. The novel O-ring seal hereof comprises the annular recess 34 and the ring 35 which is compressed against the flat surface 11. Tube 19 through its threaded portion 21 engages with an internally threaded portion 41 of elbow coupling 40, the opposite internally threaded portion 42 of which engages, in turn, with an externally threaded portion 43 of a straight connector member 44. The connector is provided at one end with a recessed portion 45 adjacent threaded portion 43 and carries a hexagonal nut 46 through which adjustment of the connector is effected together with an externally threaded portion 47 which may be adapted for connection with the flared end of a conduit as shown in Fig. 5 through a conventional lock sleeve or tightening nut.

The O-ring seal hereof in addition to being provided between wall 10 and tube 19 is also provided between the remaining separable sections namely, between tube 19 and elbow 40 and between the latter and connector 44. For this reason the internal peripheries of the elbow at both of its ends are provided with annular grooves or channels 48 and 49 which receive compressible glands or sealing rings 50 and 51 respectively, therein. Any fluid under pressure therefore attempting to escape between the end surfaces of member 10 and tube 19, or between the inner walls of the elbow and an outer wall of either tube 19 or an outer wall of the reduced portion 45 of connector 44 will simply expand the sealing glands within their respective cavities and prohibit flow of liquid therebeyond.

The invention hereof is shown in Fig. 3 of the drawing as applied to the delivery end of a pump or other suitable source of fluid under pressure requiring a male adapter or fitting, a wall 52 of a suitable source of fluid under pressure is provided with an outlet comprising a bore 53 and a countersunk bore 54, the latter at the outer end thereof having an internally threaded portion 55 which is adapted for engagement with an externally threaded portion 56 carried by one end of an adapter or connector 57 the connector at the latter end being provided with a reduced portion 58. The outer periphery of portion 58 or connector 57 is provided with an annular groove or channel 59 defining a cavity for a sealing gland or ring 60 therein, the latter engaging with the inner periphery of countersunk bore 54 whereupon any escaping fluid under pressure between connector 57 and bore 54 will compress the sealing gland to define an effective seal against passage of the fluid.

While the adapter or fitting connector 57 has been shown as being of a right angle elbow type it is to be understood that any desired shaped fitting may be used such as a straight fitting or a 45° elbow type fitting. The opposite end of connector 57 is adapted for connection to a conduit 61 by conventional means. For this purpose the latter end of connector 57 is provided with an externally threaded portion 62 together with an internally flared opening 63 which receives the tapered end of a contractible sleeve 64 having a solid rearward end 65 and a forward slotted end 66. A hollow tightening nut 67 having an internally threaded portion 68 engages with threaded portion 62 of the connector and upon turning of the nut, sleeve 64 will securely grip conduit 61. If desired, a washer 69 may be interposed between sleeve 64 and nut 67.

To the end that a leak-proof may be established between connector 57 and tightening nut 67, the inner peripheries of connector 57 are provided with an endless annular groove or channel 70 defining a cavity for a sealing gland or ring 71 which engages with the outer periphery of conduit 61. Any fluid under pressure escaping between conduit 61 and fitting 57 therefore impinges on and compresses the sealing gland so that the fluid is positively prevented from passing therebeyond.

The embodiment of the invention illustrated in Fig. 4 while generally similar to the above described forms of Figs. 1 to 3 inclusive, differs from the latter in that the novel O-ring seal thereof is arranged to the rearward of the threaded connection of two separable members rather than forwardly of such connection. The source of fluid under pressure in this instance includes a wall 72 having an outwardly extending outlet 73 thereon communicating with a bore 74 by way of a countersunk bore 75 formed in the outlet, the latter bore having an internally threaded portion 76. A connector or fitting 77 engages by way of an externally threaded end portion 78 with threaded portion 76 of the outlet and is adapted for connection to a conduit 79 by way of an externally threaded portion 80 formed near the opposite end of fitting 77 which engages with an internally threaded portion 81 formed at one end of an elbow connector 82. The opposite end of the latter is provided with an internally threaded portion 83 which engages with an externally threaded portion 84 of the conduit.

Connector or fitting 77 is provided intermediate its threaded portions 78 and 80 with a hexagonal nut 85, the flat end surface 86 of which is urged into intimate contact with the flat end surface 87 of outlet 73. An internally threaded lock nut 88 may be sleeved on fitting 77 to cooperate with threaded portion 80 thereof but this is not essential and the lock nut may be dispensed with if desired. In order to prevent a leak between outlet 73 and fitting 77, the flat end surface 86 of nut 85 is provided with an annular groove or channel 89 which defines a cavity for a compressible sealing gland or ring 90. With this arrangement any fluid under pressure escaping between outlet 73 and an outer wall of fitting 77 and beyond the threaded connections 76 and 78 will impinge on and compress the sealing ring whereby the latter will prevent passing of liquid therebeyond.

To the same end, elbow 82 is provided with two spaced annular grooves or channels 91 and 92 confining the sealing rings or glands 93 and 94, respectively, therein, the former engaging with the outer periphery of conduit 79 and the latter engaging with the outer periphery of fitting 77. Thus any fluid under pressure escaping between fitting 77 and elbow 82 or between the latter and conduit 79 will compress the related sealing rings 94 and 93 and the latter will prevent the passage of fluid therebeyond.

The delivery end of a pump or other desired source of fluid under pressure may require a female fitting rather than the male fitting of Figs. 3 and 4 and for this purpose the novel fitting of Fig. 5 may be utilized. For this purpose an elbow fitting 95 is provided at one end thereof with an internally threaded portion 96 which may, for example, engage with an externally threaded portion 43 of a connector similar to connector 44 of Fig. 2. In such an event fitting 95 is provided beyond its threaded portion 96 with an annular groove or channel 97 defining a cavity having a compressible sealing ring or gland 98 therein which will engage with the reduced end of the connector similar to reduced end 45 of connector 44. Any fluid under pressure, therefore, attempting to escape between the connector and the elbow will compress the gland which will effectively prevent the fluid from passing therebeyond. The opposite end of elbow 95 may have an externally threaded portion 99 and a tapered end 100 for connection with a conduit 101 having a flared end 102 engaging with the tapered end 100 through conventional means. Sleeved about conduit 101 and having its solid and tapered end 103 in engagement with flared end 102 of the conduit is a sleeve 104 whose forward slotted end 105 engages with the conduit. An internally threaded tightening nut 106 which cooperates with the threaded portion 99 of elbow 95 confines the sleeve therein and in response to turning of the nut the solid end 103 of the sleeve is forced against the flared end 102 of the conduit to provide a seal between the elbow and the nut and also to compress the slotted end 105 of the sleeve against the conduit for absorbing any vibration which may be developed by passage of high fluid pressures through the conduit.

There has thus been provided a novel high pressure fluid fitting which may take any desired form required for any particular installation in which the various threaded and separable sections are provided with standard straight threads thereby imparting a greater range of adjustment for the sections relative to each other than that heretofore available. In addition, the fitting thus provided is also leak-proof due to the presence of the novel O-ring seal between the various separable surfaces. The various coupling units and hexagonal nuts may be formed of hard steel and may be either cast or machined as desired.

Although several forms of the present invention have been illustrated and described in detail it is to be expressly understood that the invention is not limited thereto. Various changes may be made in the design and arrangement of the parts without departing from the spirit and scope of the invention as will now be understood by those skilled in the art.

What is claimed is:

1. A high pressure fluid connector including, in combination, an element having a smooth internal annular wall forming a passageway, an outwardly extending shoulder near the end of said annular wall, a nut rotatably mounted on said annular wall having an inwardly extending shoulder for receiving and encompassing said first shoulder and having a straight thread on its outer wall, the end face of said annular wall having an annular recess therein, an O-ring disposed in said recess having a diameter slightly larger than the depth of said recess, a mounting panel having a threaded aperture for receiving said nut, and means for supporting the flat face of a member on one side of said panel, said member having a passageway therein aligned with the threaded aperture in the panel, said connector being supported on the opposite side of the panel from the member and having said O-ring sealed directly against the face of said member about said passageway when the nut is threaded into the threaded aperture.

2. A high pressure fluid connector including, in combination, an element having a smooth internal annular wall forming a passageway, an outwardly extending integral shoulder near the end of said annular wall, the end face of said annular wall having an annular recess therein, an O-ring disposed in said recess having a diameter slightly larger than the depth thereof, a mounting plate having a first aperture therein for receiving the shouldered end of said element, and means for securing said element in said first aperture in alignment with a second aperture in a member which is supported on the face of the plate, with the O-ring compressed between the bottom of the recess and said member to permit fluid to directly pass through said element from one face of the plate to the second aperture without contacting the plate.

3. A high pressure fluid connector including, in combination, an element having a smooth internal annular wall forming a passageway, an outwardly extending integral shoulder near the end of said annular wall, the end face of said annular wall having an annular recess therein, an O-ring disposed in said recess having a diameter slightly larger than the depth thereof, a mounting plate having a first aperture therein for receiving the shouldered end of said element, means for securing said element in said first aperture in alignment with a second aperture in a member which is supported on the face of the plate, with the O-ring compressed between the bottom of the recess and said member to permit fluid to directly pass through said element from one face of the plate to the second aperture without contacting the plate, an elbow on the other end of said element the angle arm of which contains a socket having a two-section stepped cylindrical bore, the outer section being larger in internal diameter than the inner, one of said sections being threaded, the other section being plain, a fitting having a threaded section and a plain section mated in those of the arm, and an O-ring sealing said plain cylindrical sections to provide a seal in the various axially adjusted positions of said element when adjusted by the thread in said arm.

4. A high pressure fluid connector including, in combination, an element having a smooth internal annular wall forming a passageway, an outwardly extending integral shoulder near the end of said annular wall, the end face of said annular wall having an annular recess therein, an O-ring disposed in said recess having a diameter slightly larger than the depth thereof, a mounting plate having a first aperture therein for receiving the shouldered end of said element, means for securing said element in said first aperture in alignment with a second aperture in a member which is supported on the face of the plate, with the O-ring compressed between the bottom of the recess and said member to permit fluid to directly pass through said element from one face of the plate to the second aperture without contacting the plate, an elbow on the other end of said element the engaged arm of which contains a socket having a two-section stepped cylindrical bore, the outer section being larger in internal diameter than the inner, one of said sections being threaded, the other section being plain, the end of said element having a threaded section and a plain section mated in those of the arm, and an O-ring sealing said plain cylindrical sections to provide a seal in the various axially adjusted positions of said elbow when adjusted by the thread in said arm.

5. A high pressure fluid connector including, in combination, an element having a smooth internal annular wall forming a passageway, an outwardly extending integral shoulder near the end of said annular wall, the end face of said annular wall having an annular recess therein, an O-ring disposed in said recess having a diameter slightly larger than the depth thereof, a mounting plate having a first aperture therein for receiving the shouldered end of said element, means for securing said element in said first aperture in alignment with a second aperture in a member which is supported on the face of the plate, with the O-ring compressed between the bottom of the recess and said member to permit fluid to directly pass through said element from one face of the plate to the second aperture without contacting the plate, an elbow on the other end of said element, each of the two arms of said elbow containing a socket having a two-section stepped cylindrical bore, the outer section being larger in internal diameter than the inner, one of said sections being threaded, the other section being plain, a fitting, the said other end of the element and said fitting having a threaded section and a plain section mated in those of said arms, and an O-ring for each said mated plain cylindrical section in each arm to provide a seal in the various axially adjusted positions of said elbow and fitting when adjusted by the threads in said arms.

6. A high pressure fluid connector including, in combination, an element having a smooth internal annular wall forming a passageway, an outwardly extending integral shoulder near the end of said annular wall, the end of said annular wall having an annular recess therein, an O-ring disposed in said recess having a diameter slightly larger than the depth thereof, a mounting plate having a first aperture therein, a member secured to said plate and extending over said aperture and having a second aperture in alignment with the passageway in said element, and means engaging the shoulder of said element and secured to said plate from the side opposite to that on which the member is supported for retaining said O-ring compressed between said member and the bottom of said recess.

References Cited in the file of this patent

UNITED STATES PATENTS

| Number | Name | Date |
| --- | --- | --- |
| 269,626 | Bodel et al. | Dec. 26, 1882 |
| 637,541 | Wilkes | Nov. 21, 1899 |
| 966,722 | Weight | Aug. 9, 1910 |
| 1,956,683 | Hewitt | May 1, 1934 |
| 2,025,382 | Fletcher et al. | Dec. 24, 1935 |
| 2,092,135 | Parker | Sept. 7, 1937 |
| 2,104,799 | Evans | Jan. 11, 1938 |
| 2,150,221 | Hinderliter | Mar. 14, 1939 |
| 2,180,795 | Christensen | Nov. 21, 1939 |
| 2,204,536 | Grau | June 18, 1940 |
| 2,280,786 | Boynton | Apr. 28, 1942 |
| 2,346,051 | Seamark | Apr. 4, 1944 |
| 2,349,170 | Jackman | May 16, 1944 |
| 2,359,846 | Hayman | Oct. 10, 1944 |
| 2,373,253 | Martin | Apr. 10, 1945 |
| 2,412,664 | Wolfram | Dec. 17, 1946 |
| 2,413,878 | Maky | Jan. 7, 1947 |
| 2,422,597 | Steward | June 17, 1947 |
| 2,423,655 | Mars et al. | July 8, 1947 |
| 2,453,391 | Whittingham | Nov. 9, 1948 |
| 2,461,107 | Church | Feb. 8, 1949 |
| 2,462,023 | Johanson | Feb. 15, 1949 |
| 2,469,851 | Stecher et al. | May 10, 1949 |
| 2,485,976 | Main | Oct. 25, 1949 |
| 2,491,884 | West | Dec. 20, 1949 |
| 2,494,849 | Whitney | Jan. 17, 1950 |
| 2,497,986 | Goode | Feb. 21, 1950 |
| 2,515,899 | Sanger-Stevens | July 18, 1950 |
| 2,525,652 | Cunningham | Oct. 10, 1950 |

OTHER REFERENCES

Handbook on Synthetic Rubber Packings, E. F. Haughton and Co., Philadelphia, pp. 63–79, inclusive; 1st edition, 1947.